No. 869,406. PATENTED OCT. 29, 1907.
L. ATWOOD.
FISHING REEL.
APPLICATION FILED JAN. 7, 1907.
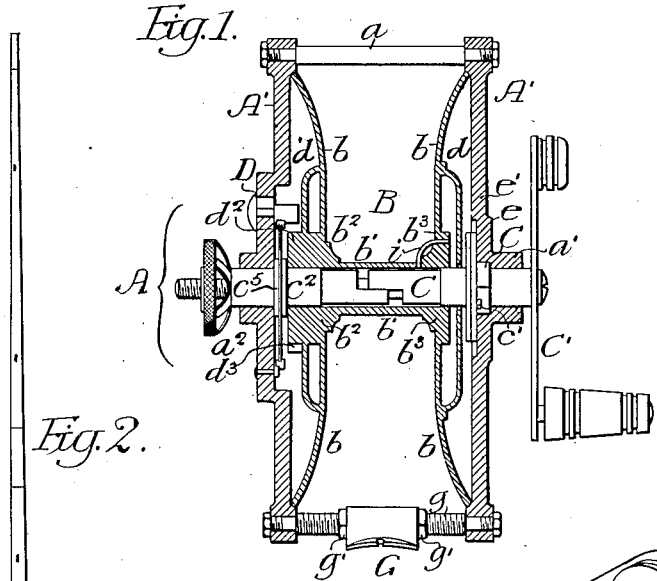
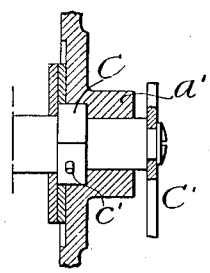
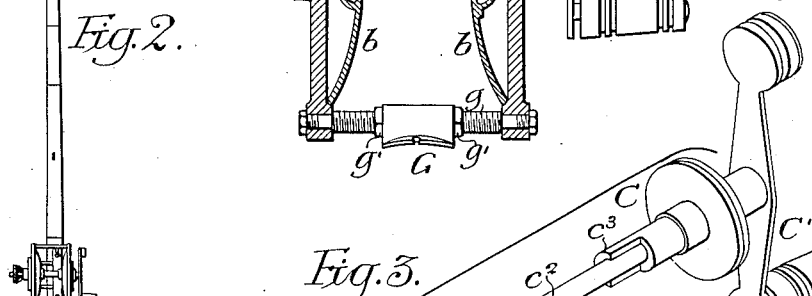
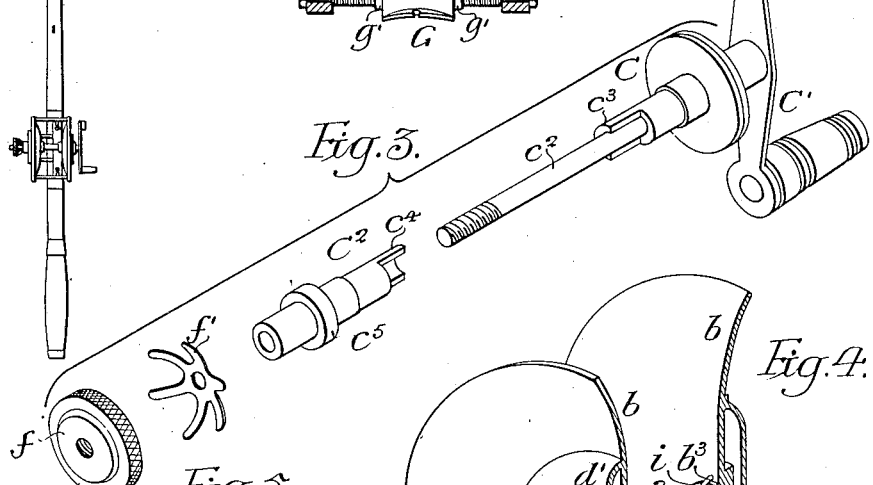
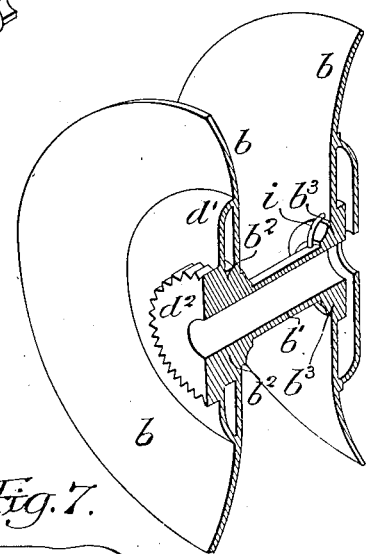
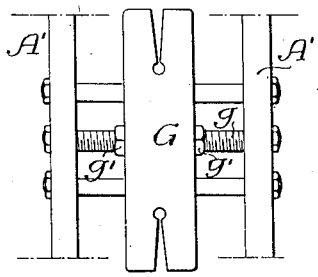
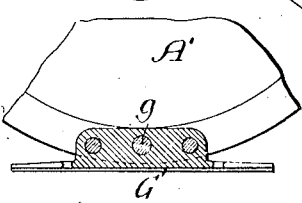
Witnesses:
Inventor:
Leonard Atwood.
by his Attorneys.

UNITED STATES PATENT OFFICE.

LEONARD ATWOOD, OF PHILADELPHIA, PENNSYLVANIA, ASSIGNOR OF ONE-FOURTH TO JOHN M. O. HEWITT, OF PHILADELPHIA, PENNSYLVANIA.

FISHING-REEL.

No. 869,406.  Specification of Letters Patent.  Patented Oct. 29, 1907.

Application filed January 7, 1907. Serial No. 351,127.

*To all whom it may concern:*

Be it known that I, LEONARD ATWOOD, a citizen of the United States, residing in Philadelphia, Pennsylvania, have invented certain Improvements in Fishing-Reels, of which the following is a specification.

My invention relates to certain improvements in fishing reels for which application for patent was filed by me on the 29th day of December, 1905, Serial Number 293,859, and the objects of my present invention are to improve the friction mechanism, to prevent the binding of the spool flanges against the body of the reel, and to adjust the reel laterally in respect to the pole. These objects I attain in the following manner, reference being had to the accompanying drawing, in which:

Figure 1, is a sectional view of my improved fishing reel; Fig. 2, is a view showing the reel mounted on a pole; Fig. 3, is a detached perspective view of the adjustable spindle and its parts; Fig. 4, is a sectional perspective view of the reel spool; Fig. 5 is, an inverted plan view of the reel seat, Fig. 6, is a view in detail of a part of Fig. 1 and Fig. 7, is a sectional view on the line 7—7, Fig. 5.

The frame of the reel consists of a body A made of two side members A′ connected together by rods $a$, which space the side members a given distance apart.

B is the spool having flanges $b$—$b$ and a hub $b'$, which is mounted on a transverse spindle C made in parts as illustrated in Fig. 3. Secured to the flanges $b$—$b$ of the spool B are disks $d$—$d'$ and the disk $d'$ is firmly secured to the enlarged portion $b^2$ of the hub $b'$, while the disk $d$ is free of the enlarged portion $b^3$ of the hub and is preferably made of spring metal; there being sufficient space between this portion of the hub and the disk to allow the disk to move towards and from the hub when end pressure is applied. In fact, in some instances both the disks $d$—$d'$ may be made of spring metal. On the portion $b^2$ of the hub is a toothed click wheel $d^2$ with which engages the click pawl D actuated by a spring $d^3$ of the usual construction.

The spindle C has a squared portion $c$ upon which is loosely mounted a friction disk $e$, so that while the friction disk will turn with the spindle it will be free to accommodate itself to the friction surface of the disk $d$ of the spool. A pin $c'$, or other stop, is used to hold the disk in position on the squared portion of the spool. $e'$ is a friction washer of leather or other suitable material placed between the disks $c$ and $d$, although this is not absolutely essential.

On one end of the spindle C is the handle C′ by which the spindle is turned and it will be noticed that the friction disk $e$ is on the handle portion of the spindle and must turn with the handle, consequently, when the friction disk is pressed hard against the spool, there is direct connection between the handle and the spool and there is no tendency for the adjusting means, which will be described hereafter, becoming loose as in reels of the ordinary construction.

It will be noticed that there is only a frictional connection between the spindle C and the spool and more or less friction can be applied according to the desire of the angler.

I preferably construct the mechanism for applying the friction in the following manner: $c^2$ is a rod forming an extension of the spindle C and this rod has a screw threaded end, as clearly shown in Fig. 3, the spindle C being mounted in the bearing $a'$ in one of the side members A′. $C^2$ is a sleeve mounted on the said rod and on the end of the rod is a nut $f$ and between this nut and the end of the spindle C is a spring washer $f'$. It will be noticed that the sleeve $C^2$ interlocks with the body portion of the spindle C. The spindle is cut partly away so as to form a projecting portion $c^3$ and the sleeve $C^2$ is also cut away to form a projecting portion $c^4$; these two portions interlock. The sleeve is held in the bearing $a^2$ by its flange $c^5$, so that when the nut $f$ is turned the spindle C is drawn towards the sleeve forcing the friction disk $e$ against the end of the spool and the spool against the flange $c^5$ which forms an abutment. There is enough play between the end of the enlarged portion of the spindle and the sleeve to allow for this movement.

On two of the transverse rods $a$ is mounted the reel seat G and passing through this reel seat and mounted in the side members A′ of the reel is a screw threaded rod $g$ on which are nuts $g'$, as clearly illustrated in Fig. 5. These nuts are mounted on each side of the reel seat G so that on backing one nut and moving the other forward the reel seat can be adjusted transversely on the reel. The object of this construction is to avoid the tendency to swing the pole when the handle is turned by bringing the handle close to the pole and, furthermore, the reel can be balanced on the pole by this lateral adjustment, as illustrated in Fig. 2, to allow the line to be wound upon the spool more evenly than heretofore.

In order to attach the line to a fixed point on the spool, I form an eye by a bent wire $i$, which is bent at right angles as shown in Fig. 1 and inserted in the hole in the hub $b'$ of the spool and in a hole at the base of the flange $b$. The reel is preferably adjusted so that this eye will come in a line with the eyes on the pole through which the cord passes and when the line is wound upon the reel it will wind from the eye side of the spool to the opposite side and the convolutions will be close together making a very compact winding of the line.

It will be seen that the reel spool when the friction nut $f$ is backed off is not in frictional contact with the spindle and can freely rotate on the spindle, and when the friction nut is turned in the opposite direction the spool can be either rigidly connected to the spindle or any amount of friction desired can be applied according to the wish of the angler.

If the reel is used in fishing for large and active fish a given pressure is applied, so that while the fish is free to take the line it will not unreel the line too rapidly and when the angler wishes to take up the line he can wind upon the handle and at the same time can adjust the friction nut to apply any amount of friction desired. When the fish takes the hook the pull upon the line will cause it to embed itself in the strands of the line upon the spool and in the ordinary construction of reel this causes the side flanges $b$ of the spool—which are usually made very light—to spread apart and bind upon the casing A. By making the spool with the disks $d$—$d'$, as shown, when the pressure is applied to frictionally connect the spindle and spool, the pressure upon the disk $d$ will cause the flanges $b$ to resist the pressure of the line and will tend to draw the two flanges of the spool towards each other, keeping them free of the side members A' of the casing, and, as before remarked, when the reel is adjusted laterally with respect to the pole the handle is brought very close to the rod so as to avoid the tendency to cause the rod to swing due to the leverage when the handle is some distance away from the rod.

I claim:—

1. The combination in a fishing reel, of a casing, a spool having flanges, one of the flanges being made of spring metal, a spindle on which the spool is mounted, a friction disk carried by the spindle and arranged to contact with the spool, the spring side flange yielding when friction is applied, substantially as and for the purpose set forth.

2. The combination in a fishing reel, of a casing, a spool having flanges, a two-part spindle upon which the spool is mounted, a friction disk carried by one part, and means for adjusting the said friction disk towards and from the spool, the flanges of the spool being made of yielding material and having two disks secured thereto, one disk being rigidly secured to the hub of the spool and the other disk being free of the hub, the said disks taking the bearing of the friction mechanism so that when transverse pressure is applied the side members of the disks will be drawn together, substantially as described.

3. The combination in a fishing reel, of a body portion having two side members, a spindle having its bearing in one of the side members, a sleeve having its bearing in the other side member, a rod forming an extension of the spindle and passing through the sleeve, an adjusting nut on the end of said rod, said spindle and sleeve having projections which interlock, the end of the projection on one part being out of contact with the other part so that the sleeve will turn with the spindle but the spindle will be free to move longitudinally in the sleeve, a friction disk on the spindle, a spool mounted on the spindle and the sleeve and having a friction surface against which the friction disk comes in contact, substantially as described.

4. The combination in a fishing reel having a body portion consisting of side members connected together, a spindle mounted in a bearing on one of the side members, a sleeve mounted in a bearing on the other side member, a rod forming an extension of the spindle passing through the sleeve, a nut on the end of the rod, said spindle having a squared portion, a friction disk loosely mounted on said squared portion, a spool mounted on the spindle and sleeve and having a friction surface against which the friction disk comes in contact, substantially as described.

5. The combination in a fishing reel, of a casing, a spool having flanges, a spindle on which the spool is mounted, an abutment at one side of the spool, a friction disk carried by the spindle and mounted at the opposite side of the spool, means for adjusting the said disk in respect to the spool, a disk secured to one flange of the spool and arranged to take the pressure of the friction disk, causing said flange to yield, substantially as and for the purpose set forth.

6. The combination in a reel, of a frame, a spool mounted thereon, and a seat laterally adjustable on the frame, substantially as described.

7. The combination in a reel, of a frame, a spool mounted on the frame, transverse bars extending from one side member of the reel to the other, a reel seat mounted on said bars, and means for laterally adjusting the said seat, substantially as described.

8. The combination in a reel, of a frame, a spool mounted on the frame, two transverse bars carried by the frame, a reel seat mounted on the bars, a transverse screw rod attached to the frame and passing through the seat, nuts on the screw rod so that the seat can be adjusted laterally and can be locked in its adjusted position, substantially as described.

In testimony whereof, I have signed my name to this specification, in the presence of two subscribing witnesses.

LEONARD ATWOOD.

Witnesses:
WM. A. BARR,
JOS. H. KLEIN.